June 19, 1962 F. J. ZAVASNIK 3,039,142
METHOD AND MEANS FOR EXTRUSION OF ELONGATED
SHAPES FROM THERMOPLASTIC MATERIALS
Filed Nov. 10, 1960 2 Sheets-Sheet 1

INVENTOR.
F. J. ZAVASNIK

BY Hudson and Young

ATTORNEYS

United States Patent Office
3,039,142
Patented June 19, 1962

3,039,142
METHOD AND MEANS FOR EXTRUSION OF ELONGATED SHAPES FROM THERMOPLASTIC MATERIALS
Fredrick J. Zavasnik, Bartlesville, Okla., assignor to Phillips Petroleum Company, a corporation of Delaware
Filed Nov. 10, 1960, Ser. No. 68,562
7 Claims. (Cl. 18—12)

This invention relates to the production of elongated shapes such as rods and bars of thermoplastic materials. In one aspect it relates to the extrusion of molten thermoplastic materials into elongated shapes having smooth, polished surfaces by substantially immediately quenching the surface temperature upon leaving the forming die and supporting the shaped article in a cooling fluid until sufficient heat has been extracted from the article to prevent softening of its surface. In another aspect his invention relates to a method and means for the production of elongated shapes of thermoplastic material wherein a forming die acts as a liquid seal around the shaped article and the forming die is separated from the extrusion die by a thermal barrier.

In the extrusion of thermoplastic shapes at high extrusion rates which are encountered in industry some of the principal fabrication difficulties are (1) obtaining and maintaining satisfactory and uniform product surfaces; (2) obtaining maximum material heat removal rates while the product is supported to avoid distortion or the setting up of strains; and (3) obtaining continuous and adequate cooling of all surfaces to prevent build-up of surface temperature due to sensible heat of the material after the surface cooling is discontinued.

It is therefore a principal object of this invention to provide a method and means for extruding elongated shapes of thermoplastic material at commercial extrusion rates without sacrifice of desired surface characteristics. It is an object of this invention to provide an extrusion apparatus wherein a liquid cooling medium can be employed immediately after the shaping of the article has been completed and also to provide a thermal barrier between the cooling liquid and the extrusion die. A further object of this invention is to provide an extrusion apparatus wherein the extruded thermoplastic material is forced to assume a larger cross sectional area than that of the extrusion die so as to form a liquid-tight seal between the extruded thermoplastic material and the forming die. Still another object of this invention is to provide an extrusion apparatus wherein a thermal barbier is positioned between the extrusion die and the forming die so that the extrudate can be cooled at the forming die without unduly cooling the extrusion die. Other and further objects and advantages will be apparent to one skilled in the art upon studying this disclosure including the detailed description of the invention and the drawing wherein:

Figure 1:
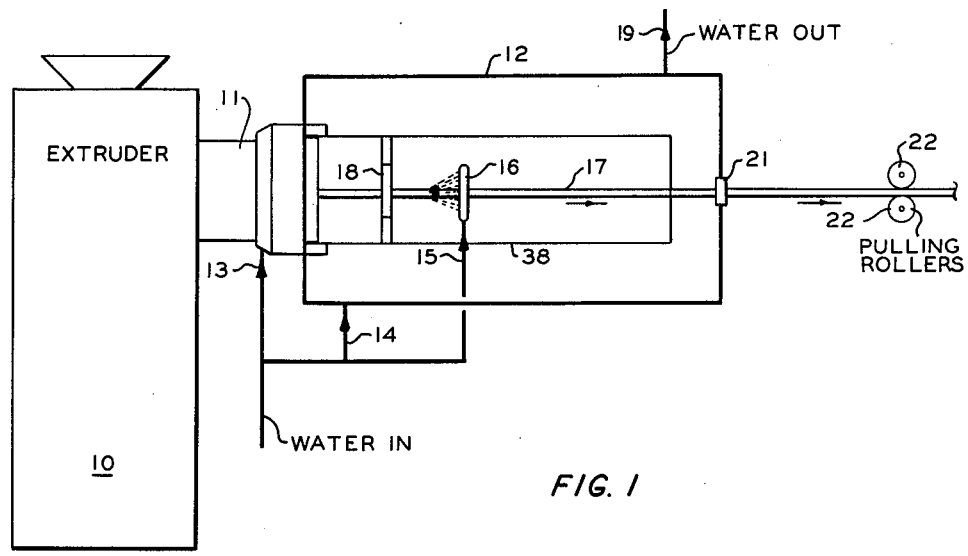
FIGURE 1 is a schematic illustration of an extrusion apparatus according to the invention.

Referring now to the drawing, and particularly to FIGURE 1, an extruder 10 having a crosshead die indicated at 11 is secured to a tank 12 containing a cooling liquid such as water. Conduit 13 supplies cooling water to an annular spray adjacent the forming ring, described in greater detail with reference to FIGURES 2 and 3. Conduit 14 supplies water to the tank 12 and conduit 15 supplies water to spray ring 16 which directs a spray of water onto the extrudate 17. Resistance ring 18 reduces the rate of travel of extrudate 17 so as to force the extrudate to assume the shape of the forming ring. Water is removed from the tank 12 via conduit 19 for reuse after being cooled. The extrudate passes through the seal 21 and is continuously removed from tank 12 by means of pulling rollers 22.

Figure 2:
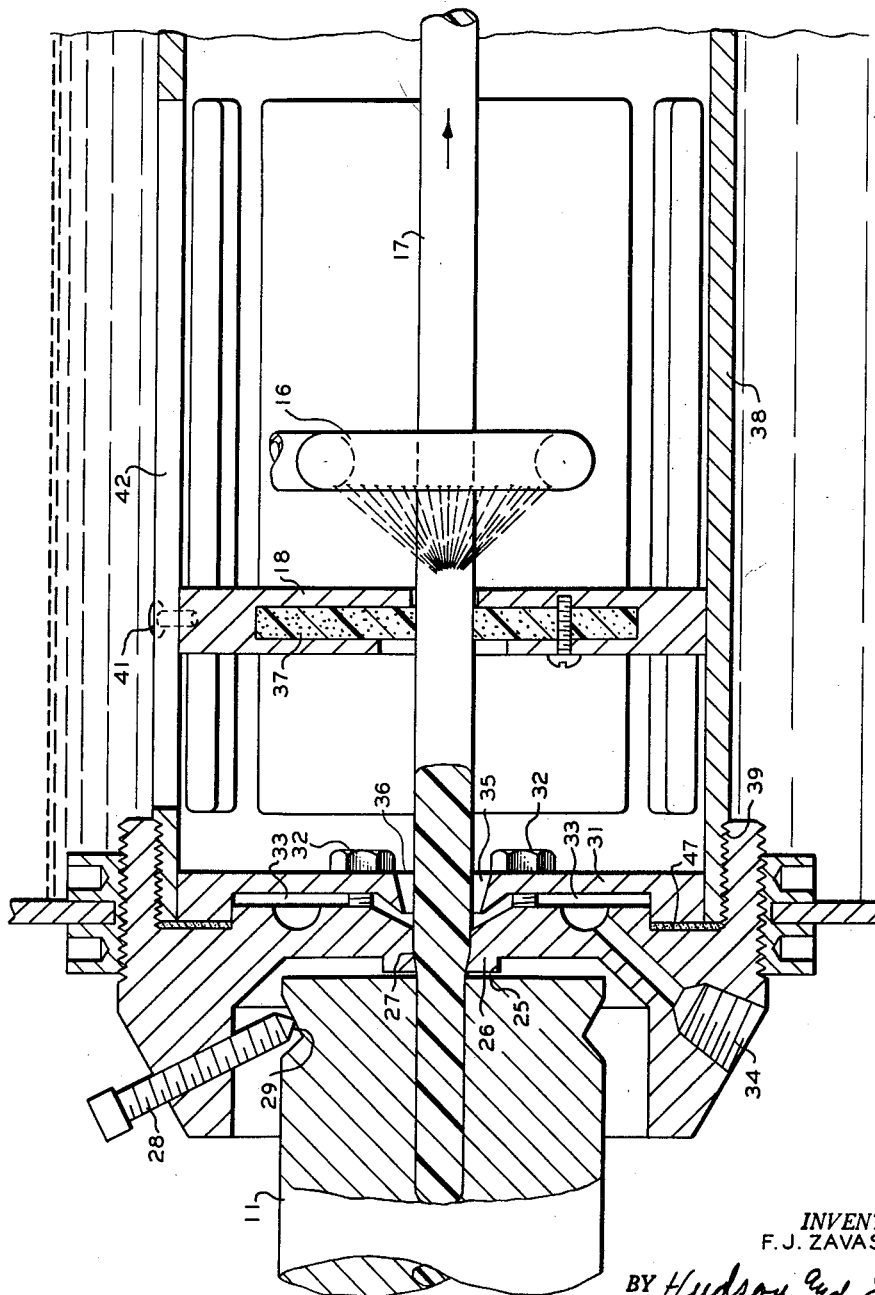
FIGURE 2 is an enlarged view, partly in section, of the extrusion apparatus of the invention.

Referring now to FIGURE 2, the molten plastic emerges from the extrusion die 11 and traverses the thermal barrier 25, which is an air space, as illustrated and enters the forming die 26 which has a die opening of increasing cross-sectional area indicated at 27. The forming die 26 is secured to the extrusion die by a plurality of bolts 28 which are pointed so as to accomplish a point contact at 29. A baffle ring 31 is secured to the body of the forming die by bolts 32 so as to form a water course 33 between the baffle ring 31 and the body of the forming die 26. Cooling water is admitted via port 34 to the water course 33 and the cooling water exits the water course 33 via the annulus 35 created between the extrudate 17 and the opening 36 of baffle ring 31. The cooling water passes through the annulus 35 in an amount sufficient to cool the surface of the extrudate 17 to a temperature at which bubbles will not form on the surface of the extrudate and with sufficient agitation to prevent formation of bubbles on the surface during the initial cooling period. The extrudate then passes through the resistance ring 18 where its rate of travel is reduced sufficiently to force the extrudate to fill completely the enlarged area of the forming die and to assume a smooth surface from the frictional contact with the smooth interior of the forming die. The resistance ring 18 contains a removable insert 37 of a material such as nylon to provide the frictional resistance required to force the extrudate to assume the size and shape of the forming die. As the extrudate leaves the resistance ring 18, it is again contacted with a spray of water directed thereon by spray ring 16 to aid in cooling the surface of the extrudate and also to keep the cooling liquid in tank 12 in motion. A slotted frame 38 is secured to the body of the forming die shown as a threaded connection at 39. The resistance ring 18 is supported by the slotted frame 38 and is secured in position by means of set screws or bolts 41 operating through the slots 42.

Figure 3:
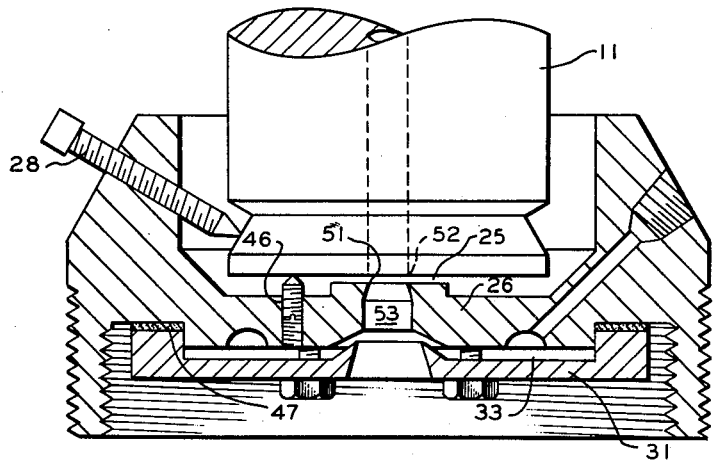
FIGURE 3 is another enlarged view, partly in section, showing the forming die and thermal barrier of the invention in greater detail.

The forming die 26, the thermal barrier 25 and the baffle ring 31 are shown in greater detail in FIGURE 3. The thermal barrier 25 is shown as an air space in the drawing; however, solid insulating materials such as asbestos or a ceramic material can be employed instead of the air space if such is desired. The thermal barrier 25 can be from about 0.001 to about 0.015 inch in thickness whether it is an air space or a solid insulating material. The spacing is controlled by bolts indicated at 28 and set screws indicated at 46. A gasket 47 prevents leakage of high pressure cooling liquid from the water course 33 into the tank 12 through the threaded connection. An air space is preferred to a solid insulating material because of its lower heat transfer coefficient characteristic. The cross-sectional dimensions of the forming die 26 at its entrance, indicated as 51 on FIGURE 3, should be somewhat larger than that of the extruder crosshead die opening indicated at 52, e.g., about 0.01 to about 0.02 inch larger. This increase in die opening size will accommodate any expansion on the part of the plasticized thermoplastic material. The water course 33 between baffle 31 and the body of the forming die 26 produces an annular spray of water upon the extrudate emerging from the forming die.

The cross-sectional area of the orifice 53 of the forming die 26 can be increased from about 1 to about 50 percent. Ordinarily the cross-sectional area of the orifice 53 will be increased from about 20 to about 30 percent. The forming die 26, having an orifice 53 of increasing cross-sectional area, forms a water seal which enables the formed article to be cooled at its surface substantially immediately following its formation without objectionable cooling of the crosshead die. This orifice also makes possible the production of elongated articles of various sizes and shapes, using the same crosshead die. The resistance ring 18 provides sufficient back pressure on the extrudate to fill completely the enlarged area of the orifice of the forming ring so that the extruder can operate at maximum efficiency regardless of the cross-sectional area of the elongated article being produced and a smooth, polished surface is imparted to the produced article.

The extrusion method of this invention provides rapid cooling of the thermoplastic melt to prevent distortion of the shape produced; minimizes orientation which results from stretching of the material before it has solidified; and prevents formation of surface defects by cooling the surface before relaxation of the material occurs. The molten extrudate emerges from the crosshead die, crosses the heat barrier and enters the forming ring where the rate of travel is reduced by the resistance provided by the brake device so that the extrudate completely fills the forming ring orifice and acquires a smooth surface resulting from the sliding contact with the smooth surface of the orifice. The extrudate is contacted with a spray of cooling liquid as it exits the forming die so that the surface of the extrudate is solidified immediately and the agitation of the cooling liquid caused by the spray prevents formation of bubbles on the surface of the extrudate and heat is extracted from the interior of the extrudate so that the residual heat within the extrudate cannot soften the hardened surface. During the period of travel of the extrudate through the cooling liquid the shaped article is supported by the cooling liquid so that it is substantially free from gravitational forces and there is no tendency for the article to sag or otherwise be deformed during the solidification period.

Rods, bars and other shapes produced by the method and means of this invention have been characterized by smooth, polished surfaces free from the rough and mottled appearance of articles produced by the prior art means.

I have described and illustrated the invention as applied to forming a rod of thermoplastic material; however, the invention is applicable to the production of bars, slabs, and all other elongated shapes which have a uniform cross-sectional dimension so that continuous extruding to produce the shaped article is possible. I have also described and illustrated a resistance ring to reduce the rate of emergence of the extrudate so as to force the extrudate to assume the size and configuration of the increased area of the forming die; however, other resistance means such as a plurality of braking rollers positioned on opposite sides of the extruded article can be used.

Cooling liquids other than water can be utilized in practicing the invention although water will usually be preferred because of its availability and specific heat characteristics. The cooling liquid should have a specific gravity not greatly different from that of the thermoplastic material being processed so as to neutralize the force of gravity during the time the material is plastic and unsupported.

That which is claimed is:

1. The method of producing a continuous elongated article of substantially constant cross-sectional area from a thermoplastic, linear solid polymer which comprises extruding molten polymer through an extruder die; passing the extrudate across a thermal barrier then into and through a cooled forming die of increasing cross-sectional area; maintaining a body of cooling fluid in contact with the forming die on the side of greatest cross-sectional area; and removing the extruded article from the forming die at a rate of travel sufficiently less than the rate of travel of the molten polymer through the extruder die to cause the polymer to occupy substantially completely the increased cross-sectional area of the forming die.

2. The method of claim 1 wherein the thermal barrier is an air space of not more than about 0.015 inch.

3. The method of claim 1 wherein the thermal barrier is a solid insulating material.

4. The method of producing a continuous, elongated article of substantially constant cross-sectional area from a thermoplastic, linear, solid polymer which comprises extruding molten polymer through an extruder die across a thermal barrier and through a forming die of increasing cross-sectional area and immediately into a vessel of cooling liquid; and continuously removing the article from the vessel of cooling liquid at a rate of travel sufficiently less than the rate of travel of the molten polymer through the extruder die to cause the polymer to occupy substantially completely the increased cross-sectional area of the forming die.

5. Apparatus for forming a continuous, elongated thermoplastic article of substantially constant cross-sectional area which comprises an extruder having an extruding die; a forming die of increasing cross-sectional area spaced from said extruder die so as to form a thermal barrier between said dies, said forming die being axially disposed with respect to said extruder die; pulling means to remove said extrudate from said dies; resistance means positioned between said pulling means and said forming die to retard the emergence of an extrudate emerging from said forming die sufficiently to force the extrudate to assume the increased cross-sectional area of said forming die; and means to contact the extrudate with a cooling fluid immediately the extrudate has passed through said forming die.

6. Apparatus for forming a continuous, elongated thermoplastic article of substantially constant cross-sectional area which comprises an extruder having an extruding die; a forming die of increasing cross-sectional area spaced from said extruding die by a thermal barrier, and axially disposed with respect to said extruder die; resistance means downstream from said forming die with respect to the direction of travel of extrudate to retard the emergence of an extrudate emerging from said forming die sufficiently to force the extrudate to assume the increased cross-sectional area of said forming die; means to contain sufficient cooling liquid positioned so as to effect complete immersion of said extrudate emerging from said forming die; means to pass a spray of cooling liquid in impinging contact with the surface of said extrudate emerging from said resistance means and immersed in said cooling liquid; and means to remove said extrudate from immersion in said cooling liquid.

7. Apparatus for forming a continuous, elongated article of substantially constant cross-sectional area which comprises, in serial relationship, an extruder having an extruding die; a forming die of increasing cross-sectional area spaced from, by a thermal barrier, and axially disposed with respect to, said extruding die; resistance means to retard the emergence of an extrudate emerging from said forming die sufficiently to force the extrudate to assume the increased cross-sectional area of said forming die; means connected to said forming die to contain sufficient cooling liquid for complete immersion of said extrudate emerging from said forming die and passing said resistance means; means to pass cooling liquid in impinging contact with the surface of said extrudate emerging from said forming die and immersed in said cooling liquid; and means to remove extrudate from said cooling liquid.

References Cited in the file of this patent

UNITED STATES PATENTS

| 1,862,947 | Smith et al. | June 14, 1932 |
| 2,452,884 | Werner | Nov. 2, 1948 |
| 2,537,977 | Dulmage | Jan. 16, 1951 |
| 2,597,553 | Weber | May 20, 1952 |
| 2,607,074 | Slaughter | Aug. 19, 1952 |